United States Patent
Suzuki et al.

(10) Patent No.: US 8,591,104 B2
(45) Date of Patent: Nov. 26, 2013

(54) TEMPERATURE SENSOR

(75) Inventors: Tatsuya Suzuki, Nagoya (JP); Go Hanzawa, Kitanagoya (JP); Takeshi Morita, Kitanagoya (JP); Akihiro Fukata, Niwa-gun (JP); Ken Masuda, Komaki (JP)

(73) Assignee: NGK Spark Plug Co., Ltd., Aichi (JP)

( * ) Notice: Subject to any disclaimer, the term of this patent is extended or adjusted under 35 U.S.C. 154(b) by 62 days.

(21) Appl. No.: 13/131,528

(22) PCT Filed: Nov. 25, 2009

(86) PCT No.: PCT/JP2009/006330
§ 371 (c)(1),
(2), (4) Date: May 26, 2011

(87) PCT Pub. No.: WO2010/061583
PCT Pub. Date: Jun. 3, 2010

(65) Prior Publication Data
US 2011/0228812 A1    Sep. 22, 2011

(30) Foreign Application Priority Data
Nov. 27, 2008 (JP) ............................... 2008-302213

(51) Int. Cl.
*G01K 7/00* (2006.01)

(52) U.S. Cl.
USPC ........... 374/163; 374/208; 374/183; 374/185; 73/866.5

(58) Field of Classification Search
USPC ......... 374/100, 163, 185, 179, 208, 141, 183, 374/144; 73/866.5; 136/200
See application file for complete search history.

(56) References Cited

U.S. PATENT DOCUMENTS

| | | | |
|---|---|---|---|
| 3,363,462 A * | 1/1968 | Sabin | 73/204.15 |
| 6,246,000 B1 | 6/2001 | Wehrmann et al. | |
| 6,264,363 B1 * | 7/2001 | Takahashi et al. | 374/185 |
| 8,092,086 B2 * | 1/2012 | Suzuki et al. | 374/208 |
| 8,177,427 B2 * | 5/2012 | Yokoi et al. | 374/208 |
| 2002/0131477 A1 * | 9/2002 | Kurano | 374/185 |
| 2006/0013282 A1 * | 1/2006 | Hanzawa et al. | 374/163 |
| 2009/0279585 A1 * | 11/2009 | Morita et al. | 374/185 |
| 2009/0279586 A1 * | 11/2009 | Suzuki et al. | 374/185 |
| 2009/0296781 A1 * | 12/2009 | Weber et al. | 374/185 |
| 2009/0323764 A1 * | 12/2009 | Im | 374/183 |
| 2009/0323765 A1 * | 12/2009 | Yokoi et al. | 374/185 |

FOREIGN PATENT DOCUMENTS

| | | | |
|---|---|---|---|
| JP | 54151484 A * | 11/1979 | |
| JP | 2000-097781 A | 4/2000 | |
| JP | 2000-266609 A | 9/2000 | |
| JP | 2002-168702 A | 6/2002 | |
| JP | 2004-233236 A | 8/2004 | |

* cited by examiner

*Primary Examiner* — Gail Verbitsky
(74) *Attorney, Agent, or Firm* — Sughrue Mion, PLLC

(57) ABSTRACT

A temperature sensor having a weld zone between an element electrode wire and a sheath core wire. When a section of the weld zone is taken orthogonally to the axial direction and in such a manner as to pass through a center point, L/D is greater or equal to 0.6, wherein D represents the diameter of the element electrode wire, and L represents the length of a chord connecting a first weld point and a second weld point as defined herein.

5 Claims, 12 Drawing Sheets

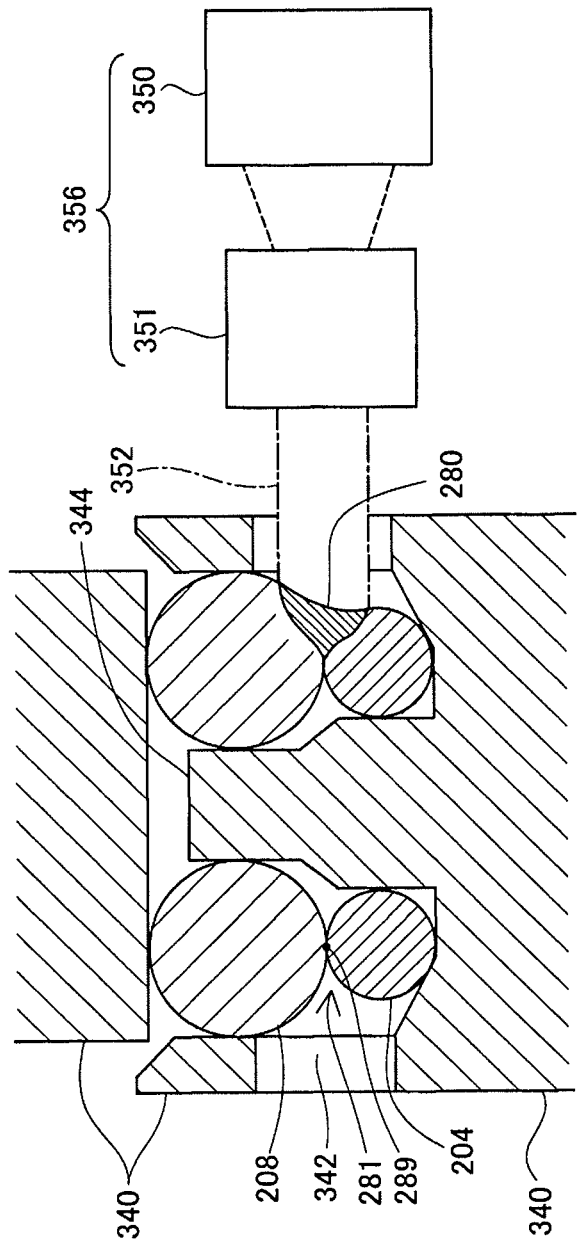

FIG. 5(a)
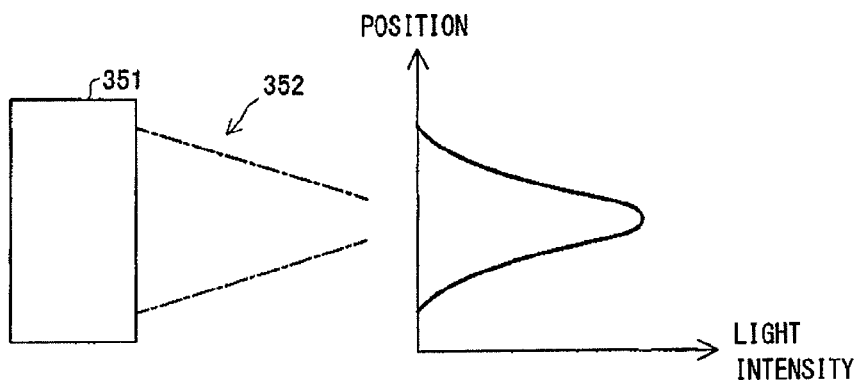
FIG. 5(b)
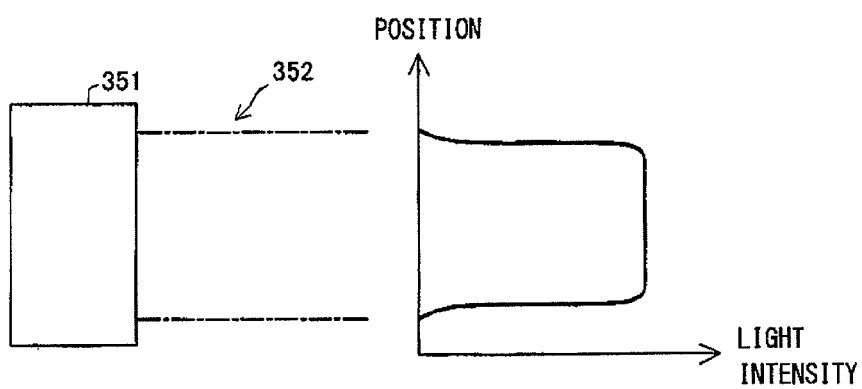
FIG. 5(c)
| LASER COND. | No. 1 | No. 2 | No. 3 | No. 4 |
|---|---|---|---|---|
| BEAM SHAPE | SPOT | SPOT | FLAT | FLAT |
| PULSE VOLTAGE (V) | 100 | 80 | 80 | 120 |
| PULSE WIDTH (msec) | 2 | 5 | 5 | 4 |

X-X SECTION

| LASER COND. | No. 1 | No. 2 | No. 3 | No. 4 |
|---|---|---|---|---|
| BEAM SHAPE | SPOT | SPOT | FLAT | FLAT |
| PULSE VOLTAGE (V) | 100 | 80 | 80 | 120 |
| PULSE WIDTH (msec) | 2 | 5 | 5 | 4 |

FIG. 9
| LASER COND. | PENETRATION RATIO (L/D) | X-X SECTION | |
|---|---|---|---|
| No.1 | LESS THAN 0.6 | 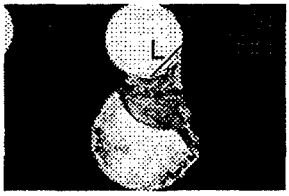 L/D=0.38 | 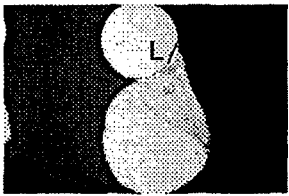 L/D=0.31 |
| No.2 | 0.6 OR HIHGER | 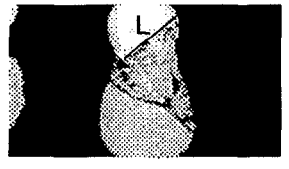 L/D=0.94 |  L/D=0.94 |
| No.3 | LESS THAN 0.6 | 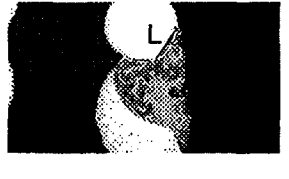 L/D=0.45 | 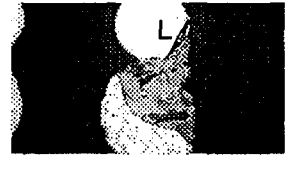 L/D=0.55 |
| No.4 | 0.6 OR HIHGER | 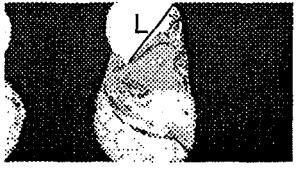 L/D=0.97 | 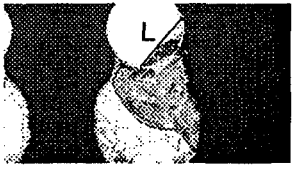 L/D=0.84 |

| LASER COND. | No. 1 | No. 2 | No. 3 | No. 4 |
|---|---|---|---|---|
| BEAM SHAPE | SPOT | SPOT | FLAT | FLAT |
| PULSE VOLTAGE (V) | 100 | 80 | 80 | 120 |
| PULSE WIDTH (msec) | 2 | 5 | 5 | 4 |

TEMPERATURE SENSOR

TECHNICAL FIELD

The present invention relates to a temperature sensor having a temperature-sensing element, such as a thermistor element, and, particularly, to a weld zone between an element electrode wire and a sheath core wire.

BACKGROUND ART

Conventionally known temperature sensors for detecting the temperature of exhaust gas from an automobile or the like are described in Patent Documents 1 and 2 mentioned below. These temperature sensors have a thermistor element composed of a thermistor sintered-body and element electrode wires, and a sheath member configured such that sheath core wires are electrically insulatively held in a sheath tube. The element electrode wires and the corresponding sheath core wires are joined together through respective weld zones formed by laser welding.

PRIOR ART DOCUMENT

Patent Document
Patent Document 1: Japanese Patent Application Laid-Open (kokai) No. 2004-233236
Patent Document 2: Japanese Patent Application Laid-Open (kokai) No. 2000-266609

However, conventionally, in some cases, the strength of a weld zone between an element electrode wire and a sheath core wire has been insufficient. For example, the temperature of exhaust gas, which is a subject of measurement by a temperature sensor, possibly varies over a wide range from a low-temperature zone of about −40° C. to a high-temperature zone of about 1,000° C. Accordingly, the temperature sensor may be used for detecting temperatures in such a wide temperature range. Therefore, the temperature sensor is exposed to an environment of repeated cooling/heating (low-temperature/high-temperature) cycles. In this case, the element electrode wires and the sheath core wires undergo repeated contraction/expansion, so that the weld zones between the element electrode wires and the sheath core wires are possibly fractured.

In some cases, in order to hold the thermistor element or the like, a space enclosed by a metal tube is filled with cement formed of a heat-resistant oxide ($Al_2O_3$ (alumina), etc.). FIG. 1 is a pair of sectional views showing the configuration of a conventional temperature sensor, cutting away only a metal tube 112. In this case, when the temperature sensor is rapidly cooled from a high temperature to a low temperature, cooling starts from the metal tube 112, which is an outer peripheral member. At this time, the metal tube 112 is higher in thermal expansion coefficient than a cement 190 charged into the space enclosed by the metal tube 112. Therefore, as shown in FIG. 1(*b*), when the metal tube 112 starts to contract as a result of exposure to cooling, the contraction of the cement 190 fails to follow the contraction of the metal tube 112; thus, a front end portion (bottom portion) of the metal tube 112 presses the internal cement 190 in the direction of arrow A. Accordingly, the front-end surface of a thermistor element 102 (more specifically, a thermistor sintered-body 103) held in the cement 190 is also pressed toward a sheath member 106 (rearward). As a result, shear stress is applied to weld zones 180 as indicated by arrows B. If the strength of the weld zones 180 is insufficient, the weld zones 180 may be fractured.

SUMMARY OF THE INVENTION

Problems to be Solved by The Invention

In view of the above problem, an object of the present invention is to provide a temperature sensor having improved fracture strength of a weld zone between an element electrode wire and a sheath core wire.

Means for Solving the Problems

The present invention has been conceived to solve, at least partially, the above problem and can be embodied in the following modes or application examples.

[Application Example 1] A temperature sensor of application example 1 comprises a temperature-sensing element having a temperature-sensing portion and a circular columnar element electrode wire connected at a front end portion to the temperature-sensing portion and extending rearward from the temperature-sensing portion; a sheath member having a circular columnar sheath core wire overlapping the periphery of a rear end portion of the element electrode wire and electrically communicating with the element electrode wire; and a weld zone formed through radiation of a laser beam to an overlapping region of the element electrode wire and the sheath core wire and connecting the element electrode wire and the sheath core wire together. The temperature sensor is characterized in that, when, with the weld zone being viewed from a direction from which a contact portion between the element electrode wire and the sheath core wire is visible, there is determined a center point of a line segment connecting a point located on the surface of the weld zone and closest to the temperature-sensing portion and a point located on the surface and farthest from the temperature-sensing portion, and a section of the weld zone is taken orthogonally to the axial direction of the sheath member and in such a manner as to pass through the center point, as viewed on the section, L/D is equal to or greater than 0.6, wherein D represents the diameter of the element electrode wire, and L represents the length of a chord connecting a first weld point and a second weld point, the first weld point representing the intersection of the weld zone and the circumference of the element electrode wire located toward a side from which the laser beam is radiated, and the second weld point representing the intersection of the weld zone and an imaginary circumference which starts from the first weld point and traces, within the weld zone, the circumference of the element electrode wire as viewed before welding.

[Application Example 2] The temperature sensor according to application example 1 further comprises an enclosing member having a closed-bottomed tubular shape having a bottom portion formed at a front end, and enclosing at least the temperature-sensing element and the weld zone, and a holding member charged into at least a region of a space enclosed by the enclosing member which region encompasses the temperature-sensing element and the weld zone.

[Application Example 3] The temperature sensor according to application example 1 or 2, wherein the weld zone is formed plurally in the overlapping region.

Effects of the Invention

According to the temperature sensor of application example 1, fracture strength of the weld zone between the element electrode wire and the sheath core wire can be improved as compared with a conventional weld zone.

According to the temperature sensor of application example 2, in which the holding member is charged into at least the region which encompasses the temperature-sensing element and the weld zone, even when the enclosing member starts to contract as a result of exposure to cooling, and thus, the bottom portion of the enclosing member presses the holding member toward the temperature-sensing portion, since fracture strength of the weld zone between the element electrode wire and the sheath core wire can be improved as compared with a conventional weld zone, the possibility of fracture of the weld zone can be lowered.

Further, according to the temperature sensor of application example 3, since the weld zone between the element electrode wire and the sheath core wire which has improved fracture strength as compared with a conventional weld zone is provided plurally, reliability of the temperature sensor can be enhanced.

BRIEF DESCRIPTION OF THE DRAWINGS

FIG. 4 is a view showing a step of joining element electrode wires and corresponding sheath core wires together by laser welding.

FIGS. 5(a), 5(b) and 5(c) are a set of diagrams showing the shapes and laser conditions of a laser beam used in the embodiment.

FIG. 9 is a diagram showing X-X sections and penetration ratios L/D of the samples which underwent laser welding shown in FIG. 8.

DESCRIPTION OF REFERENCE NUMERALS

Figures 1A, 1B:
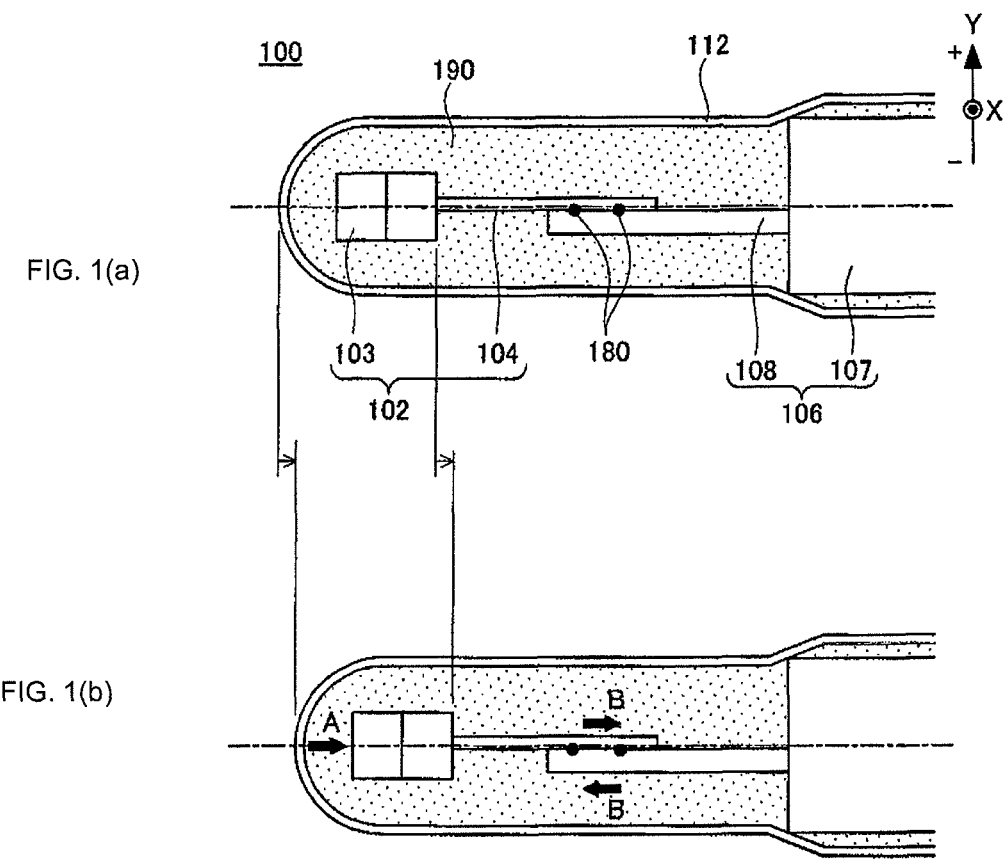
FIGS. 1(a) and 1(b) are pair of sectional views showing the configuration of a conventional temperature sensor.

100: temperature sensor
102: thermistor element
103: thermistor sintered-body
104: element electrode wire
200: temperature sensor
202: thermistor element
203: thermistor sintered-body
204: element electrode wire
206: sheath member
207: sheath tube
208: sheath core wire
212: metal tube
240: mounting member
242: flange portion
243: sheath portion
244: first stepped portion
245: mounting seat
246: second stepped portion
250: nut member
252: hexagonal nut portion
254: threaded portion
260: tubular member
271: insulation tube
272: crimp terminal
273: lead wire
274: seal member
280: weld zone
281: overlapping region
282: imaginary circumference
283: bottom point
284: top point
285: center point
286: first weld point
288: second weld point
289: contact portion
290: cement
340: fixing member
342: through hole
344: partition portion
350: laser oscillator
351: beam-forming optical system
352: laser beam
356: laser irradiation apparatus
400: furnace

MODES FOR CARRYING OUT THE INVENTION

Figure 2:
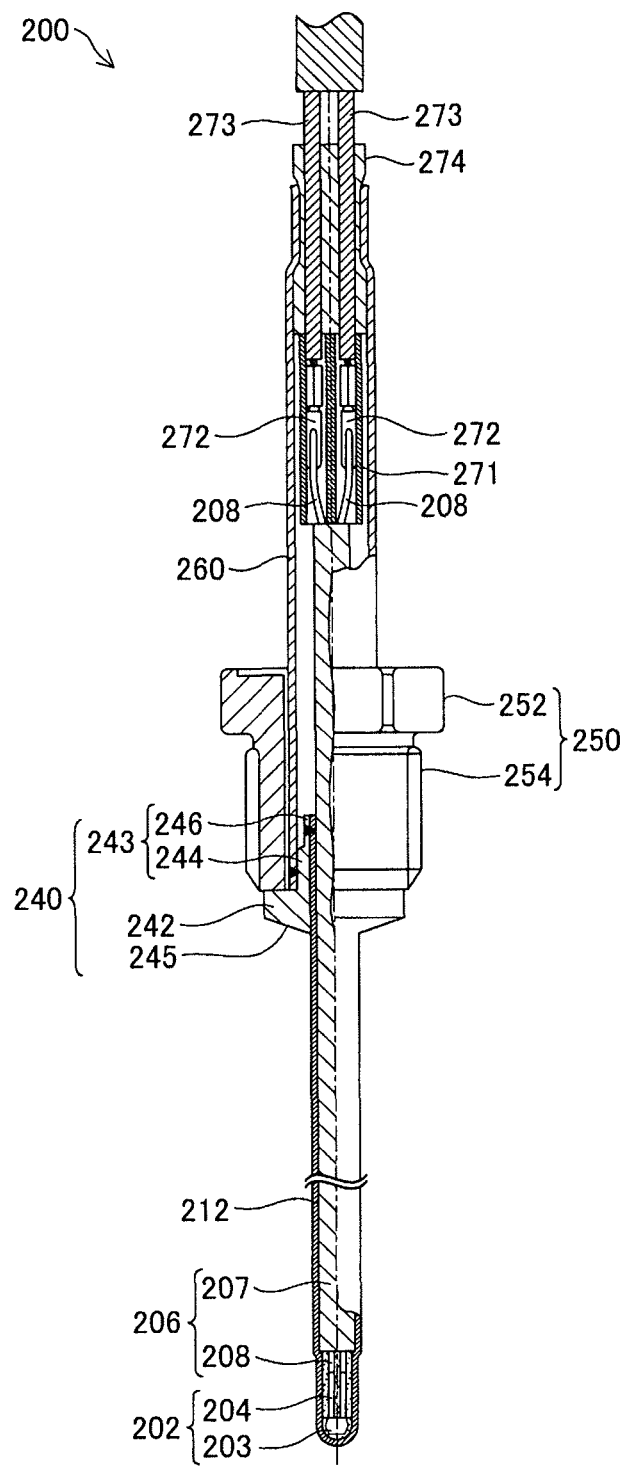
FIG. 2 is a partially cutaway, sectional view showing the structure of a temperature sensor according to an embodiment of the present invention.

Next, modes for carrying out the present invention will be described in the following order:
A. Embodiment
B. Modification
A. Embodiment:

FIG. 2 is a partially cutaway, sectional view showing the structure of a temperature sensor 200 according to an embodiment of the present invention. The temperature sensor 200 includes a closed-bottomed metal tube 212 having a closed front end and an open rear end and extending in the axial direction; a mounting member 240 joined to a rear end portion of the metal tube 212; a nut member 250 provided separately from the mounting member 240 and having a hexagonal nut portion 252 and a threaded portion 254; and a tubular member 260 enclosing at least a portion of a sheath member 206, which will be described later, jointed, at a front end portion, to the mounting member 240, and extending in the axial direction. The axial direction means the longitudinal direction of the temperature sensor 200 and corresponds to the vertical direction in FIG. 2. The front side corresponds to the lower side in FIG. 2, and the rear side corresponds to the upper side in FIG. 2.

The temperature sensor 200 has a thermistor element 202 provided within the metal tube 212. The thermistor element 202 includes a thermistor sintered-body 203 and element electrode wires 204. The temperature sensor 200 is attached to, for example, an exhaust pipe of an internal combustion engine in such a manner that the thermistor element 202 is disposed within the exhaust pipe in which exhaust gas flows, whereby the temperature sensor 200 can detect the temperature of the exhaust gas.

The sheath member 206 is configured such that two sheath core wires 208 are electrically insulatively held in the interior of a sheath tube 207, and disposed internally of the metal tube 212, the mounting member 240, and the tubular member 260. The sheath core wires 208 extending from the front end of the sheath tube 207 are joined to the element electrode wires 204 of the thermistor element 202 through formation of weld zones (not shown) by means of laser welding, which will be described later. Meanwhile, the sheath core wires 208 extending from the rear end of the sheath tube 207 are connected, via crimp terminals 272, to lead wires 273 for connection to an external circuit (e.g., the electronic control unit (ECU) of a vehicle). Insulation tubes 271 electrically insulate the sheath core wires 208 extending from the rear end of the sheath tube 207 from each other, and the crimp terminals 272 from each other. The lead wires 273 are configured such that a conductor is covered with an isolative covering material, and are disposed in such a manner as to extend through a seal member 274 made of heat-resisting rubber.

The mounting member 240 includes a tubular sheath portion 243 extending in the axial direction, and a flange portion 242 located frontward of the sheath portion 243, having an outside diameter greater than that of the sheath portion 243, and projecting radially outward. The sheath portion 243 has a two-stepped shape consisting of a first stepped portion 244 located on the front side, and a second stepped portion 246 located on the rear side and having an outside diameter smaller than that of the first stepped portion 244. Through radially performed full-circle laser welding, the tubular member 260 and the first stepped portion 244 are joined together, and the second stepped portion 246 and the outer peripheral surface of the metal tube 212 are joined together. The front end of the flange portion 242 is formed into a mounting seat 245 which is tapered such that the diameter reduces gradually in the frontward direction. The mounting seat 245 is fitted to a tapered portion which is provided on, for example, an exhaust pipe (not shown) at a sensor mounting position. The mounting seat 245 is in direct, close contact with the tapered portion of the exhaust pipe, thereby preventing leakage of exhaust gas to the exterior of the exhaust pipe.

The nut member 250 is fitted to the tubular member 260 in such a manner as to be rollable around the periphery of the tubular member 260. After the mounting seat 245 is disposed in contact with a taper surface at the sensor mounting position, the threaded portion 254 of the nut member 250 is threadingly engaged with a thread groove formed around the sensor mounting position, whereby the mounting member 240 is fixed at the sensor mounting position.

Figure 3A:
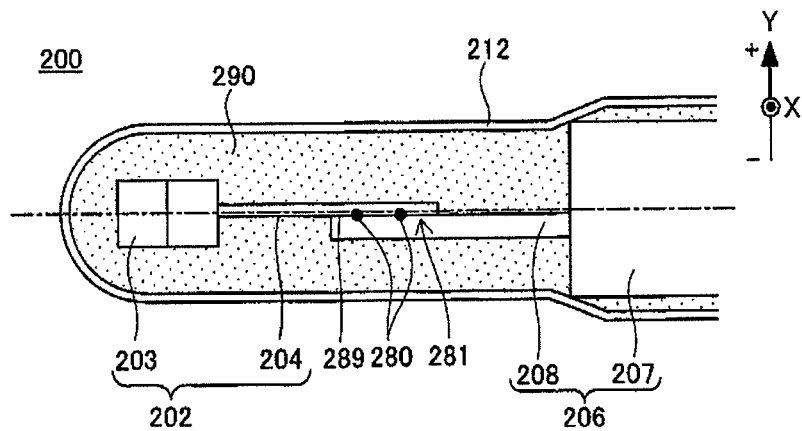
FIGS. 3(a) and 3(b) are a pair of explanatory views showing the configuration of essential portions of the temperature sensor according to the embodiment.
Figure 3B:
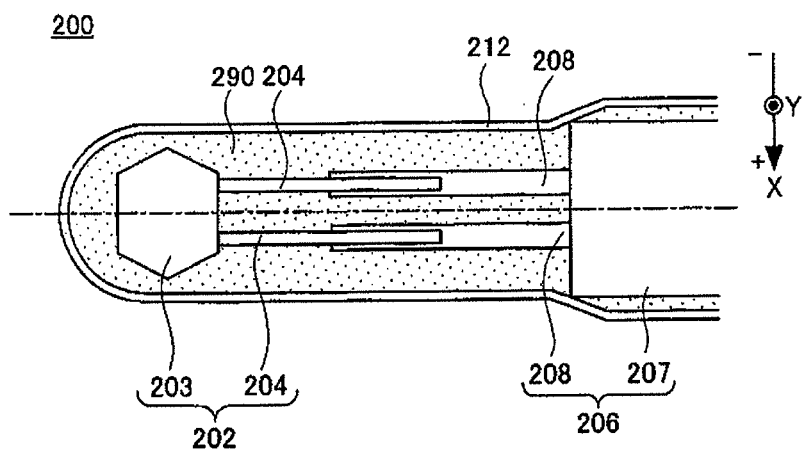

Next, essential portions of the present embodiment will be described with reference to FIG. 3. FIG. 3 is a pair of explanatory views showing the configuration of essential portions of the temperature sensor 200 according to the present embodiment, cutting away only the metal tube 212. FIG. 3(a) is an enlarged view of essential portions of the temperature sensor 200 as viewed by cutting the temperature sensor 200 of FIG. 2 by a plane which is perpendicular to the paper on which FIG. 2 appears, and in parallel with the central axis of the temperature sensor 200 and which cuts one of the two element electrode wires 204. FIG. 3(b) is a view as viewed by turning FIG. 3(a) by 90 degrees about the center axis of the temperature sensor 200. That is, FIG. 3(b) is a top view of the temperature sensor 200 of FIG. 3(a).

The thermistor element 202 includes the thermistor sintered-body 203 and the two element electrode wires 204, which are partially embedded in the thermistor sintered-body 203. The thermistor sintered-body 203 is formed of a perovskite-type oxide whose base composition is (Sr, Y)(Al, Mn, Fe)$O_3$. The thermistor sintered-body 203 has the shape of a hexagonal column. The two element electrode wires 204 extend from the rear end surface of the thermistor sintered-body 203. The sheath member 206 is configured such that the two sheath core wires 208 are disposed in the sheath tube 207 made of a stainless steel alloy, while the sheath tube 207 is filled with an electrically insulative sheath filler (not shown) for holding the sheath core wires 208. The two sheath core wires 208 extend from the front end of the sheath tube 207. Each of the two element electrode wires 204 of the thermistor element 202 and each of the two sheath core wires 208 of the sheath member 206 have a circular cross section and overlap each other. An overlapping region 281 is subjected to laser welding, whereby two weld zones 280 are formed, thereby joining each of the element electrode wires 204 and each of the sheath core wires 208 together. The overlapping region 281 indicates a region in the vicinity of a contact portion 289 between each element electrode wire 204 and each sheath core wire 208.

The metal tube 212 accommodates the thermistor element 202 and a portion of the sheath member 206. Further, a cement 290 made of ceramic is charged into a space enclosed by the metal tube 212 and holds the thermistor element 202 and the sheath member 206. This structure can be obtained, for example, as follows: after the weld zones are formed by laser welding for joining, the thermistor element 202 and the sheath member 206 are placed in the internal space of the metal tube 212 into which unset cement is charged; then, the cement is set through application of heat.

FIG. 4 shows a step of joining the element electrode wires 204 and the corresponding sheath core wires 208 together by laser welding. FIG. 4 is a sectional view taken orthogonally to the axial direction of the element electrode wires 204 and the sheath core wires 208 at a position where the weld zones 280 are to be formed. In joining, first, the element electrode wires 204 and the corresponding sheath core wires 208 are overlapped each other and fixed by a fixing member 340. Next, a laser beam 352 formed into a predetermined shape (the present embodiment uses YAG laser) is radiated to the overlapping region 281 in the vicinity of the contact portion between the element electrode wire 204 and the sheath core wire 208 through a corresponding one of through holes 342 formed in the sides of the fixing member 340. The laser beam 352 is emitted from a laser oscillator 350, formed into a laser beam shape, which will be described later, by a beam-forming optical system 351, and radiated to the overlapping region 281. When the overlapping region 281 between the element electrode wire 204 and the sheath core wire 208 is irradiated with the laser beam, the element electrode wire 204 and the sheath core wire 208 in the region irradiated with the laser beam are fused, whereby the weld zone 280 is formed. The fixing member 340 can fix two pairs each consisting of the element electrode wire 204 and the sheath core wire 208 via a partition portion 344. A laser irradiation apparatus 356 may also be disposed on the left side of the partition portion 344 in FIG. 4. Through similar radiation of the laser beam, the weld zones 280 can be formed simultaneously for two pairs each consisting of the element electrode wire 204 and the sheath core wire 208.

FIG. 5 is a set of diagrams showing the shapes and laser conditions of the laser beam 352 used in the present embodiment. The following two kinds of beam shapes are employed for the laser beam 352 used for laser welding: a spot beam shape shown in FIG. 5(a), which is a convergent beam shape having a Gaussian light intensity distribution; and a flat beam shape shown in FIG. 5(b), which is a parallel beam shape having a flat-top light intensity distribution. Laser welding was performed under conditions No. 1 to No. 4 shown in FIG. 5(c).

Figure 6A:
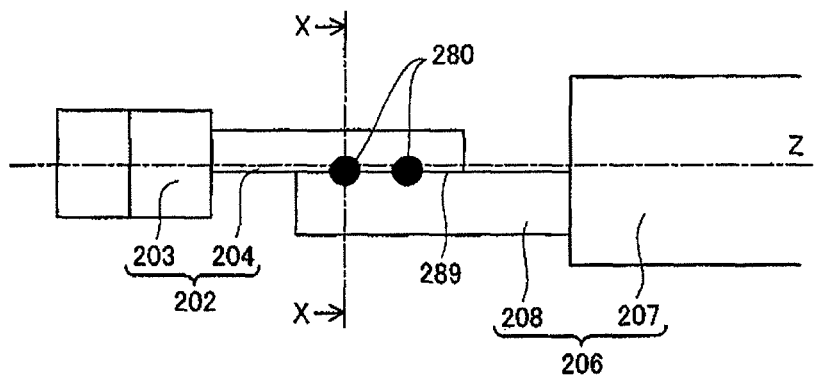
FIGS. 6(a) and 6(b) are a pair of views for specifying a section for calculating the amount of penetration of a weld zone into the element electrode wire.
Figure 6B:
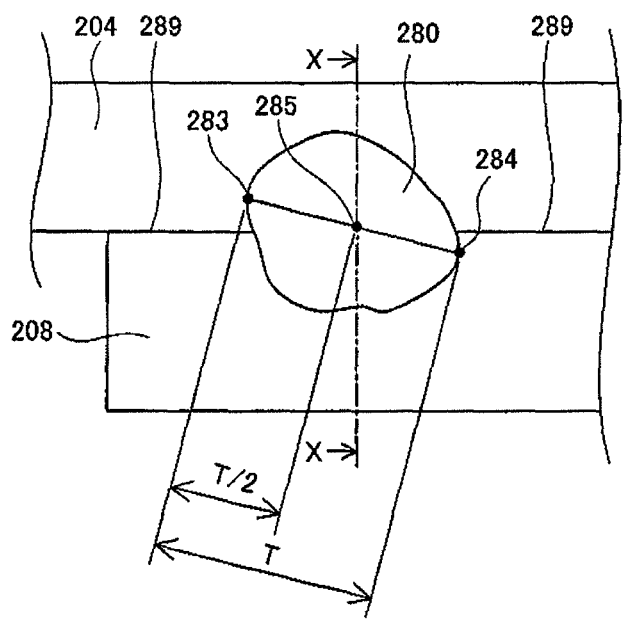

FIG. 6 is a pair of views for specifying a section for calculating the amount of penetration of the weld zone 280 into the element electrode wire 204. When the weld zone 280 formed by laser welding is to be observed on a section orthogonal to the axial direction (Z-axis) of the sheath member 206 as shown in FIG. 6(a), a method of specifying the section is shown in FIG. 6(b). FIG. 6(b) is an enlarged view showing one of two weld zones 280 and its periphery. First, when the weld zone 280 is viewed from a direction from which the contact portion 289 between the circular columnar element electrode wire 204 and the circular columnar sheath core wire 208 is visible (perceptible to the eye), there are determined a point 283 located on a surface of the weld zone 280 and closest to the thermistor sintered-body 203 (top point) and a point 284 located on the surface and farthest from the thermistor sintered-body 203 (bottom point). Next, a center point 285 of a line segment connecting the two points is determined. By use of a section (X-X section) taken orthogonally to the axial direction of the sheath member 206 and in such a manner as to pass through the center point 285 of the weld zone 280, the amount of penetration of the weld zone 280 into the element electrode wire 204, which will be described later, was calculated. In FIG. 6(b), the thermistor sintered-body 203 is located at the left, and the sheath tube 207 is located at the right.

Figure 7:
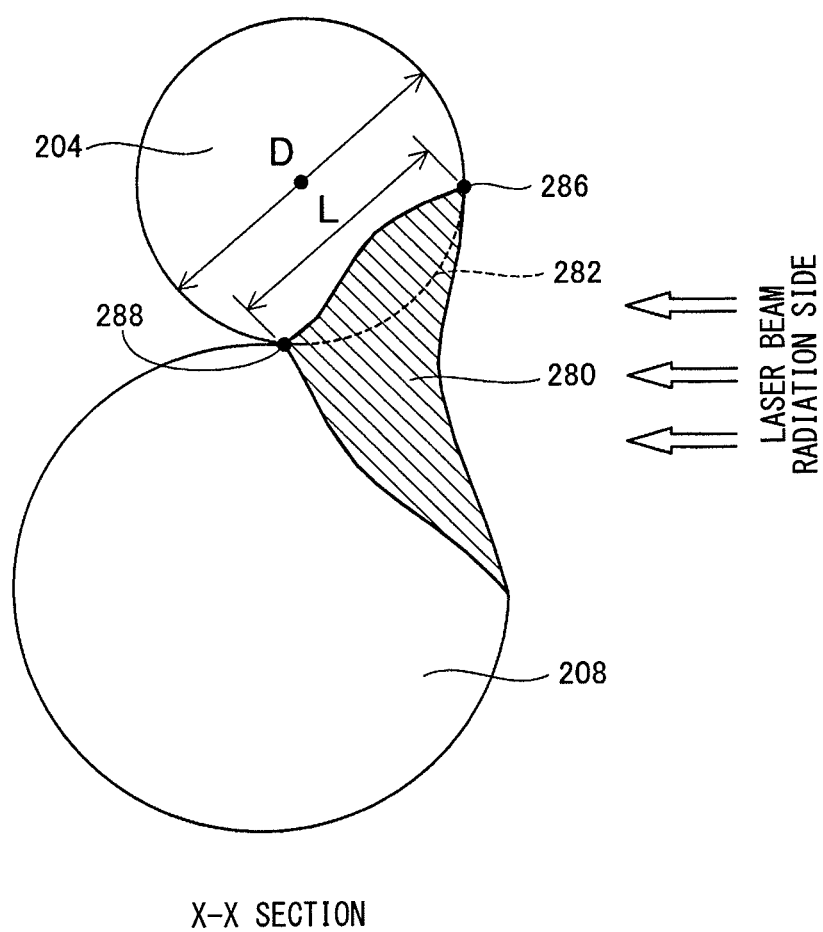
FIG. 7 is a view for explaining a method of calculating the amount of penetration of the weld zone as viewed on X-X section.

FIG. 7 is a view for explaining a method of calculating the amount of penetration of the weld zone 280 as viewed on X-X section. First, a first weld point 286 represents the intersection of the outline of the weld zone 280 and the outline of the element electrode wire 204 located toward a side (right side in FIG. 7) from which the laser beam is radiated. Next, a second weld point 288 represents the intersection of the outline of the weld zone 280 and an imaginary circumference 282 which starts from the first weld point 286 and traces, within the weld zone 280, the circumference of the element electrode wire 204 as viewed before welding. The ratio of length L of a line segment connecting the first weld point 286 and the second weld point 288 to diameter D of the element electrode wire 204; i.e., L/D, is calculated. The ratio L/D can be used as an index indicative of the amount of penetration of the weld zone 280 into the element electrode wire 204. Hereinafter, the ratio L/D is called the "penetration ratio."

Figures 8A, 8B:
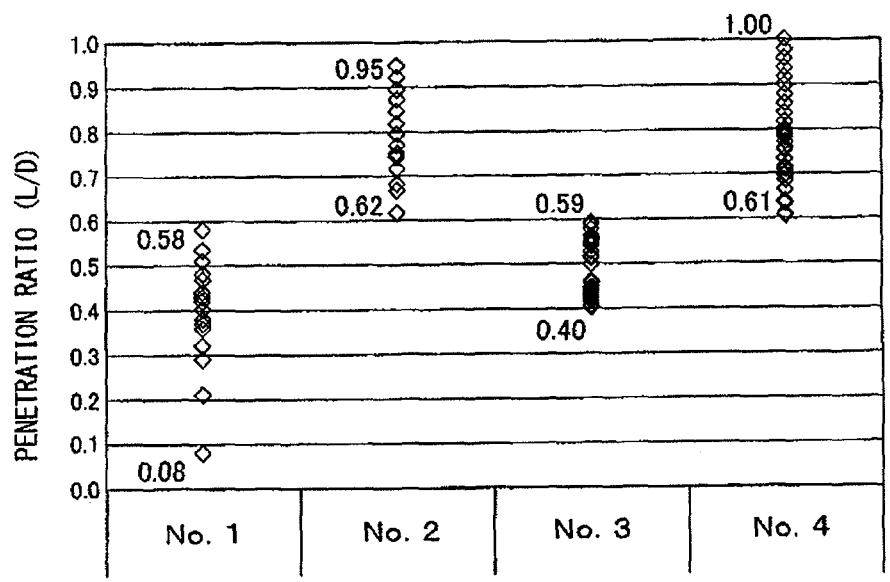
FIGS. 8(a) and 8(b) are a pair of diagrams showing the relationship between penetration ratio L/D and various laser conditions when the element electrode wire and the sheath core wire are laser-welded together under the laser conditions.

FIG. 8 is a pair of diagrams showing the relationship between the penetration ratio L/D and various laser conditions when the element electrode wire 204 and the sheath core wire 208 are laser-welded together under the laser conditions. In FIG. 8(a), numeric values appearing at the left of plotted penetration ratios L/D obtained through laser welding under each of the laser conditions are minimum and maximum values among the obtained penetration ratios L/D. Laser welding was performed by use of a plurality of samples under each of laser conditions No. 1 to No. 4 shown in FIG. 5(c). The samples which underwent laser welding under laser conditions No. 1 and No. 3 exhibited a penetration ratio L/D of less than 0.6. By contrast, the samples which underwent laser welding under laser conditions No. 2 and No. 4 exhibited a penetration ratio L/D of 0.6 or higher.

FIG. 9 is a diagram showing X-X sections and penetration ratios L/D of the samples which underwent laser welding shown in FIG. 8. FIG. 9 shows the X-X sections of a part of the samples which underwent laser welding shown in FIG. 8. In the X-X sections, an imaginary circumference of the element electrode wire 204 is represented by the white broken line, and a measured line segment is represented by the black solid line.

Figure 10:
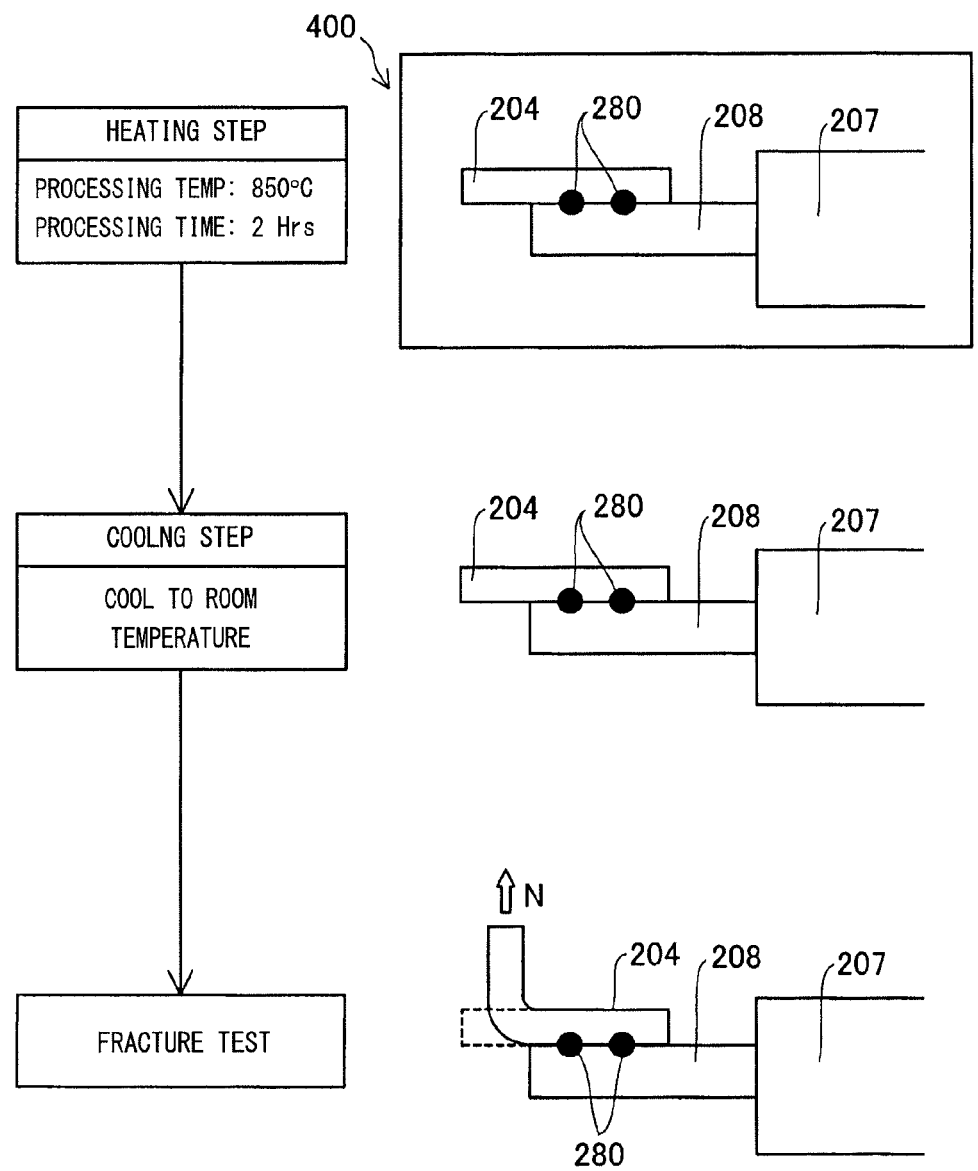
FIG. 10 is a diagram showing a fracture test method for the weld zone.

FIG. 10 is a diagram showing a fracture test method for the weld zone 280 which is formed between the element electrode wire 204 and the sheath core wire 208 by laser welding. The fracture test employed a plurality of samples in which two weld zones 280 were formed under laser conditions No. 1 to No. 4 shown in FIG. 5(c). The samples in which the weld zones 280 were formed for joining were heated in a furnace 400 at a processing temperature of 850° C. for a processing time of two hours and then cooled to the room temperature (about 25° C.). The cooled samples were tested as follows: an end portion of the element electrode wire 204 was pulled upward in FIG. 10 at a rate of 2 mm per minute, thereby obtaining fracture strength (N).

FIG. 11 is a pair of diagrams showing the results of the fracture test shown in FIG. 10. Numeric values appearing at the left of plotted fracture strengths obtained through laser welding under each of the laser conditions are minimum and maximum values among the obtained fracture strengths. According to the test results, the samples which underwent laser welding under laser conditions No. 1 and No. 3 exhibited a fracture strength of 10 N or lower. By contrast, the samples which underwent laser welding under laser conditions No. 2 and No. 4 exhibited a fracture strength in excess of 10 N.

As apparent from the results shown in FIGS. 8, 9, and 11, the samples which underwent laser welding under laser conditions No. 2 and No. 4; i.e., the samples having a penetration ratio L/D of 0.6 or higher, have a fracture strength in excess of 10 N. Therefore, even in the case where the temperature sensor is exposed to an environment of repeated low-temperature/high-temperature cycles, the possibility of fracture of the weld zone 280 formed by laser welding between the element electrode wire 204 and the sheath core wire 208 can be lowered.

Figures 11A, 11B:
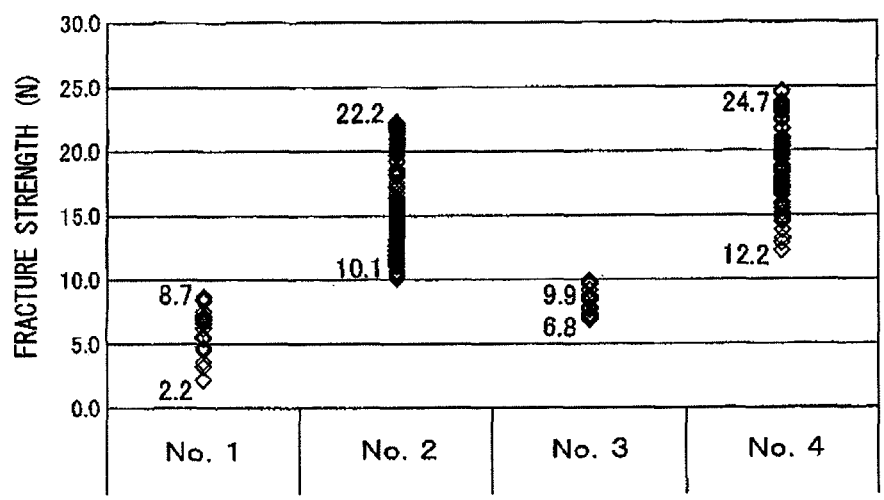
FIGS. 11(a) and 11(b) are a pair of diagrams showing the results of the fracture test.
Figure 12A:
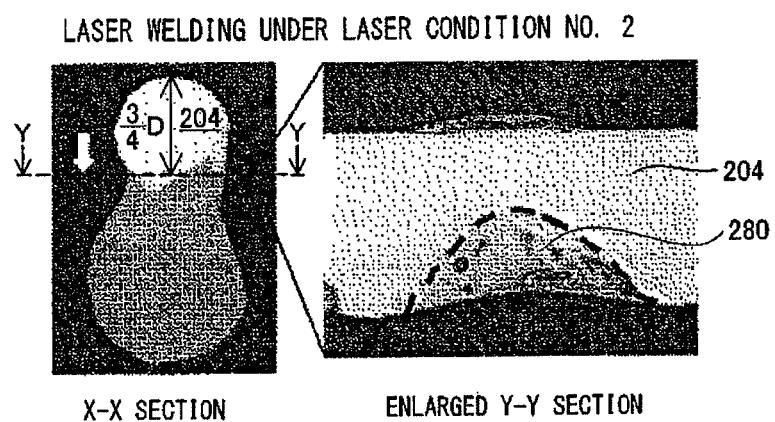
FIGS. 12(a) and 12(b) are a pair of views showing an enlarged Y-Y section of the weld zone of the element electrode wire.
Figure 12B:
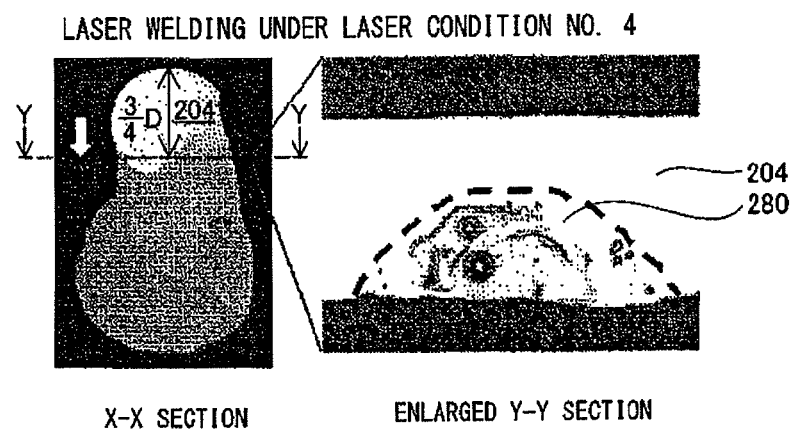

FIG. 12 is a pair of views showing an enlarged Y-Y section of the weld zone 280 of the element electrode wire 204. The Y-Y section is a section taken orthogonally to the X-X section and in parallel with the axial direction of the element electrode wire 204 at a position corresponding to ¾ the diameter D of the element electrode wire 204 (i.e., in FIG. 11, a position corresponding to a length of ¾ the diameter D of the element electrode wire 204 as measured from the top of the element electrode wire 204). FIG. 11(a) is a sectional view of the weld zone of a sample having undergone laser welding under laser condition No. 2 (i.e., the beam has a spot beam shape; and the sample has a penetration ratio L/D of 0.6 or higher). FIG. 11(b) is a sectional view of the weld zone of a sample having undergone laser welding under laser condition No. 4 (i.e., the beam has a flat beam shape; and the sample has a penetration ratio L/D of 0.6 or higher). Notably, since the X-X section and the enlarged Y-Y section cannot be observed with respect to the same sample, the X-X section and the enlarged Y-Y section which are shown in FIG. 11 are not of the same sample, but are of different samples having undergone laser welding under the same laser condition (laser condition No. 2 or No. 4). As is apparent from FIG. 12, even in the case of samples having a penetration ratio L/D of 0.6 or higher, the sample which has undergone laser welding by a laser beam having a flat beam shape exhibits the formation of the weld zone 280 extending over a wider range in the element electrode wire 204 (penetration into the element electrode wire 204 over a wider range) as compared with the sample which has undergone laser welding by a laser beam having a spot beam shape).

Also, in the case of laser welding by a laser beam having a flat beam shape, light intensity can be distributed uniformly as compared with the case of laser welding by a laser beam having a spot beam shape, so that a laser beam having predetermined intensity can be radiated stably to the overlapping region 281 between the element electrode wire 204 and the sheath core wire 208. In the case of laser welding by a laser beam having a spot shape, the center and its periphery of the laser beam exhibit a high light intensity, potentially involving the following problems: the weld zone 280 is formed excessively large under a certain laser condition, and the fixing member 340 (see FIG. 4) is damaged.

Thus, a flat beam shape is preferred to a spot beam shape for a laser beam to be used for laser welding. A laser beam having a flat beam shape encompasses not only a laser beam having a completely flat top distribution of light intensity but also a laser beam having a substantially flat top distribution of light intensity which is more flattened (evened) as compared with a Gaussian distribution, or bell-type distribution, of light intensity.

B. Modifications

The present invention is not limited to the above-described embodiment or mode, but may be embodied in various other forms without departing from the gist of the invention. For example, the following modifications are possible.

B-1. First Modification

In the above embodiment, the weld zone 280 between the element electrode wire 204 and the sheath core wire 208 is formed at two positions by laser welding. However, the number of locations where the weld zone 280 is formed is not limited thereto, but may be one or three or more. In the case of formation of the weld zone 280 at three or more locations, forming the weld zones 280 at equal intervals is preferred.

B-2. Second Modification

The above embodiment is described while mentioning the temperature sensor 200 configured such that a portion of the sheath member 206 is accommodated in the metal tube 212 fixed to the mounting member 240. However, the present invention can also be applied to a temperature sensor having another structure. For example, the present invention can be applied to a temperature sensor having the following structure: the sheath tube 207 of the sheath member 206 is fixedly attached to the inside of the mounting member 240; and a closed-bottomed tubular metal cap is externally welded to a front end portion of the sheath tube 207 projecting frontward from the front end of the mounting member 240 while the thermistor element 202 and the weld zones 280 are accommodated within the metal cap. In this case, the metal cap corresponds to the enclosing member appearing in a claim.

B-3. Third Modification

In the above embodiment, the cement 290 is used as a holding member. However, in place of the cement 290, various insulation holders made of ceramic as disclosed in Japanese Patent Application Laid-Open (kokai) No. 2004-233236 may be used to hold the thermistor element 202, etc.

B-4. Fourth Modification

In the above embodiment, the welding zone 280 having a fracture strength in excess of 10 N is formed under laser conditions No. 2 and No. 4 shown in FIG. 5(c). However, in place of the laser conditions, the following laser conditions can be employed for laser welding for forming the weld zone 280 having a fracture strength in excess of 10 N: in the case of a laser beam having a spot beam shape, a pulse voltage of 70 V to 90 V inclusive and a pulse width of 3 msec to 7 msec inclusive; and in the case of a laser beam having a flat beam shape, a pulse voltage of 100 V to 140 V inclusive and a pulse width of 3 msec to 7 msec inclusive.

The invention claimed is:

1. A temperature sensor comprising:
a temperature-sensing element having a temperature-sensing portion and a circular columnar element electrode wire connected at a front end portion to the temperature-sensing portion and extending rearward from the temperature-sensing portion,
a sheath member having a circular columnar sheath core wire overlapping a periphery of a rear end portion of the element electrode wire and electrically communicating with the element electrode wire, and
a weld zone formed through radiation of a laser beam having a spot beam shape, a pulse voltage of 70 V to 90 V inclusive and a pulse width of 3 msec to 7 msec inclusive or having a flat beam shape, a pulse voltage of 100 V to 140 V inclusive and a pulse width of 3 msec to 7 msec inclusive at the overlapping region of the element electrode wire and the sheath core wire and connecting the element electrode wire and the sheath core wire together,
the weld zone being characterized by a cross-section of the weld zone taken orthogonally to an axial direction parallel to the sheath member and in such a manner as to pass through a center point of a weld zone line segment that connects a top point located on a surface of the weld zone and closest to the temperature-sensing portion and a bottom point located on the weld zone surface and farthest from the temperature-sensing portion when viewed from a direction from which a contact portion between the circular columnar element electrode wire and the circular columnar sheath core wire is visible,
as viewed on the cross-section, ratio L/D is equal to or greater than 0.6, wherein D represents a diameter of the element electrode wire, and L represents a length of a chord connecting a first weld point and a second weld point, the first weld point representing a topmost intersection of the weld zone and a circumference of the element electrode wire, and the second weld point representing a bottommost intersection of the weld zone and the circumference of the element electrode wire.

2. A temperature sensor according to claim 1, further comprising:
an enclosing member having a closed-bottomed tubular shape having a bottom portion formed at a front end, and enclosing at least the temperature-sensing element and the weld zone, and
a holding member charged into at least a region of a space enclosed by the enclosing member which region encompasses the temperature-sensing element and the weld zone.

3. A temperature sensor according to claim 1, wherein the weld zone is formed at a plurality of locations in the overlapping region.

4. A temperature sensor according to claim 2, wherein the weld zone is formed at a plurality of locations in the overlapping region.

5. A temperature sensor according to claim 1, wherein the element electrode wire has a diameter smaller than that of the sheath core wire.

* * * * *